(12) United States Patent
Wu et al.

(10) Patent No.: US 12,525,174 B2
(45) Date of Patent: Jan. 13, 2026

(54) DISPLAY PANEL AND DISPLAY DEVICE

(71) Applicant: Wuhan China Star Optoelectronics Semiconductor Display Technology Co., Ltd., Hubei (CN)

(72) Inventors: Yang Wu, Hubei (CN); Chaohuang Mai, Hubei (CN); Xin Wang, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 18/474,270

(22) Filed: Sep. 26, 2023

(65) Prior Publication Data

US 2024/0265851 A1    Aug. 8, 2024

(30) Foreign Application Priority Data

Feb. 8, 2023    (CN) .......................... 202310116024.2

(51) Int. Cl.
*G09G 3/32*     (2016.01)
*G06F 3/041*    (2006.01)
*G06F 3/044*    (2006.01)

(52) U.S. Cl.
CPC ........... *G09G 3/32* (2013.01); *G06F 3/04164* (2019.05); *G06F 3/0443* (2019.05); *G06F 3/0446* (2019.05)

(58) Field of Classification Search
CPC .. G06F 3/0412; G06F 3/04164; G06F 3/0443; G06F 3/0446; G09G 3/20; G09G 3/32; G09G 2354/00
See application file for complete search history.

(56) References Cited

U.S. PATENT DOCUMENTS

| 11,797,137 B2* | 10/2023 | Yan ....................... G06F 3/0412 |
| 2012/0127412 A1* | 5/2012 | Lee ................... G02F 1/136286 349/139 |
| 2014/0022148 A1* | 1/2014 | Kim ................. G02F 1/136286 345/55 |
| 2014/0320761 A1* | 10/2014 | Misaki ................. G06F 3/0446 349/12 |

FOREIGN PATENT DOCUMENTS

CN    113282187 A  *  8/2021  ........... G06F 3/0412

* cited by examiner

*Primary Examiner* — Julie Anne Watko
(74) *Attorney, Agent, or Firm* — Nathan & Associates Patent Agents Ltd.; Menachem Nathan

(57) ABSTRACT

A display panel and a display device are provided. The display panel includes a substrate, a first metal layer and a second metal layer. The first metal layer includes a first touch wiring. The second metal layer includes a touch electrode and a second touch wiring. The first touch wiring is electrically connected to a corresponding touch electrode through a first via hole. The touch electrode further includes a touch metal side edge on a side near a wiring region. The first touch wiring at least partially overlaps with an adjacent second touch wiring, and the first via hole at least partially overlaps with a touch metal side edge of a corresponding touch electrode.

20 Claims, 11 Drawing Sheets

DISPLAY PANEL AND DISPLAY DEVICE

CROSS-REFERENCE TO RELATED APPLICATION

This application claims the priority to Chinese Application No. 202310116024.2, filed on Feb. 8, 2023, the contents of which are incorporated herein by reference in their entirety.

FIELD

The present disclosure relates to the field of design and preparation of display panels, and more particularly, to a display panel and a display device.

BACKGROUND

With the continuous development of preparation technology of a display panel, requirements for various performance of display panels and the display devices are put forward.

Touch display panels are widely used in a variety of different types of display devices. In order to ensure a high touch performance of the display panel, multiple departments need to cooperate with each other at different stages. A resistance value of a metal resistance of a touch layer has a great influence on the touch performance. A low metal resistance of the touch layer can increase a touch reporting rate. A higher reporting rate means a better touch effect. In existing art, a high reporting rate is obtained usually by widen a corresponding touch metal layer wiring and reducing a corresponding resistance value. However, as the wiring of the touch metal layer is widened, a width of a binding region of the display panel tends to be too large, which is detrimental to preparation of a narrow frame display panel. Meanwhile, in a conventional wiring structure, a double-layer touch metal wiring is usually provided in the wiring region to reduce a touch resistance. However, when the double-layer touch metal wiring is provided, a width of the double-layer touch metal wiring is large, and a spacing between adjacent metal wirings is small, so that the problem of short circuit is easy to occur. Therefore, the need for a narrow frame display panel cannot be realized, which is detrimental to further improve the comprehensive performance of the display panel.

In summary, the touch metal wiring within the touch display panel prepared in existing art has a large width, which is prone to short circuit, and is not conducive to further development of a narrow frame display panel.

SUMMARY

According to an embodiment of the present disclosure, there is provided a display panel and a display device, to effectively improve a problem that short circuit easily occurs between touch metal wirings within an existing touch display panel and requirements of a narrow frame display panel cannot be realized.

According to the present disclosure, a display panel has a display region and a wiring region on a side of the display region. The display panel includes a substrate; a first metal layer on a side of the substrate; and a second metal layer on a side of the second metal layer away from the substrate. The first metal layer includes multiple first touch wirings in the wiring region. The second metal layer includes multiple touch electrodes in the display region and multiple second touch wirings in the wiring region. The second touch wirings are electrically connected to a corresponding touch electrode, and the first touch wirings are electrically connected to a corresponding touch electrode through a first via hole. Each of the first touch wirings includes a first touch sub-wiring in a first direction. Each of the second touch wirings includes a second touch sub-wiring in the first direction. The first touch sub-wiring overlaps with an adjacent second touch sub-wiring. At least part of the touch electrode includes a touch metal side edge near a side of the wiring region. The first via hole overlaps with a touch metal side edge of a corresponding touch electrode. The first via hole is on a side of the corresponding touch metal side edge near the display region and does not exceed a boundary on a side of the touch metal side edge near the display region side.

According to an embodiment of the present disclosure, the touch metal side edge includes a first metal cladding part corresponding to the first via hole, and a metal side edge part between the first metal cladding parts, and a width of the first metal cladding part is greater than a width of the metal side edge part. The first metal cladding part is on a side of the corresponding touch metal side edge near the display region, and does not exceed the touch metal side edge towards the wiring region.

According to an embodiment of the present disclosure, the first touch wiring further includes a second metal cladding part corresponding to the first via hole, and a width of the second metal cladding part is greater than a width of the metal side edge part. In a vertical projection direction corresponding to the substrate, the second metal cladding part is on a side of the corresponding touch metal side edge near the display region and does not exceed the touch metal side edge towards the wiring region.

According to an embodiment of the present disclosure, a minimum distance between the first metal cladding part and a second touch sub-wiring of an adjacent second touch wiring is greater than or equal to 10 um.

According to an embodiment of the present disclosure, a ratio between the width of the first metal cladding part and the width of the metal side edge part is in a range of 1.5-2. A ratio between the width of the first metal cladding part and a width of the first via hole is in a range of 3-4.

According to an embodiment of the present disclosure, the display panel further comprises a light-emitting layer between the substrate and the first metal layer. The light-emitting layer includes multiple light-emitting pixels. The touch electrode includes a pixel opening corresponding to the light-emitting pixel and a touch sensing part between the pixel openings. The touch sensing part is electrically connected to the touch metal side edge. A first via hole is provided corresponding to the pixel opening, and the first via hole and an adjacent touch sensing part are provided at intervals.

According to an embodiment of the present disclosure, a minimum distance between the first metal cladding part and an adjacent light-emitting pixel is greater than or equal to 15 um.

According to an embodiment of the present disclosure, the display panel further comprises a light-emitting layer between the substrate and the first metal layer, the light-emitting layer including multiple light-emitting pixels. The touch electrode includes a pixel opening provided corresponding to the light-emitting pixel and a touch sensing part between the pixel openings, the touch sensing part being electrically connected to the touch metal side. The first via hole is disposed at an electric connection point of the touch sensing part and the touch metal side edge.

According to an embodiment of the present disclosure, a minimum distance between the first metal cladding part and an adjacent light-emitting pixel is less than or equal to 9.8 um.

According to an embodiment of the present disclosure, a display device includes a display panel according to an embodiment of the present disclosure.

Advantageous Effects of an embodiment of the present disclosure include: compared with existing art, an embodiment of the present disclosure is directed to a display panel and a display device. The display panel includes a substrate, a first metal layer and a second metal layer. The first metal layer includes multiple first touch wiring, the second metal layer includes a touch electrode and a second touch wire. The first touch wiring is electrically connected to a corresponding touch electrode through a first via. The first touch wiring further includes a first touch sub-wiring. The second touch wiring further includes a second touch sub-wiring. The touch electrode further includes a touch metal side edge on a side near the wiring region. The first touch sub-wiring at least partially overlaps with an adjacent second touch sub-wiring. A first via hole is provided on a side of a corresponding touch metal side edge near the display region, does not exceed the touch metal side edge towards the wiring region, and at least partially overlaps with the touch metal side edge of the corresponding touch electrode. In an embodiment of the present disclosure, by providing the first touch sub-wiring and the second touch sub-wiring that at least partially overlap, the width of the wiring region effectively reduced and the narrow frame arrangement of the display panel is realized.

DESCRIPTION OF DRAWINGS

In order that embodiments or technical solutions in existing art may be described more clearly, reference will now be made to the accompanying drawings which are to be used in the description of the embodiments or the existing art. It will be apparent that the accompanying drawings in the description below are merely some embodiments of the present disclosure, and other drawings may be obtained according to the accompanying drawings by those skilled in the art without involving any inventive effort.

DETAILED DESCRIPTION

Figure 1:
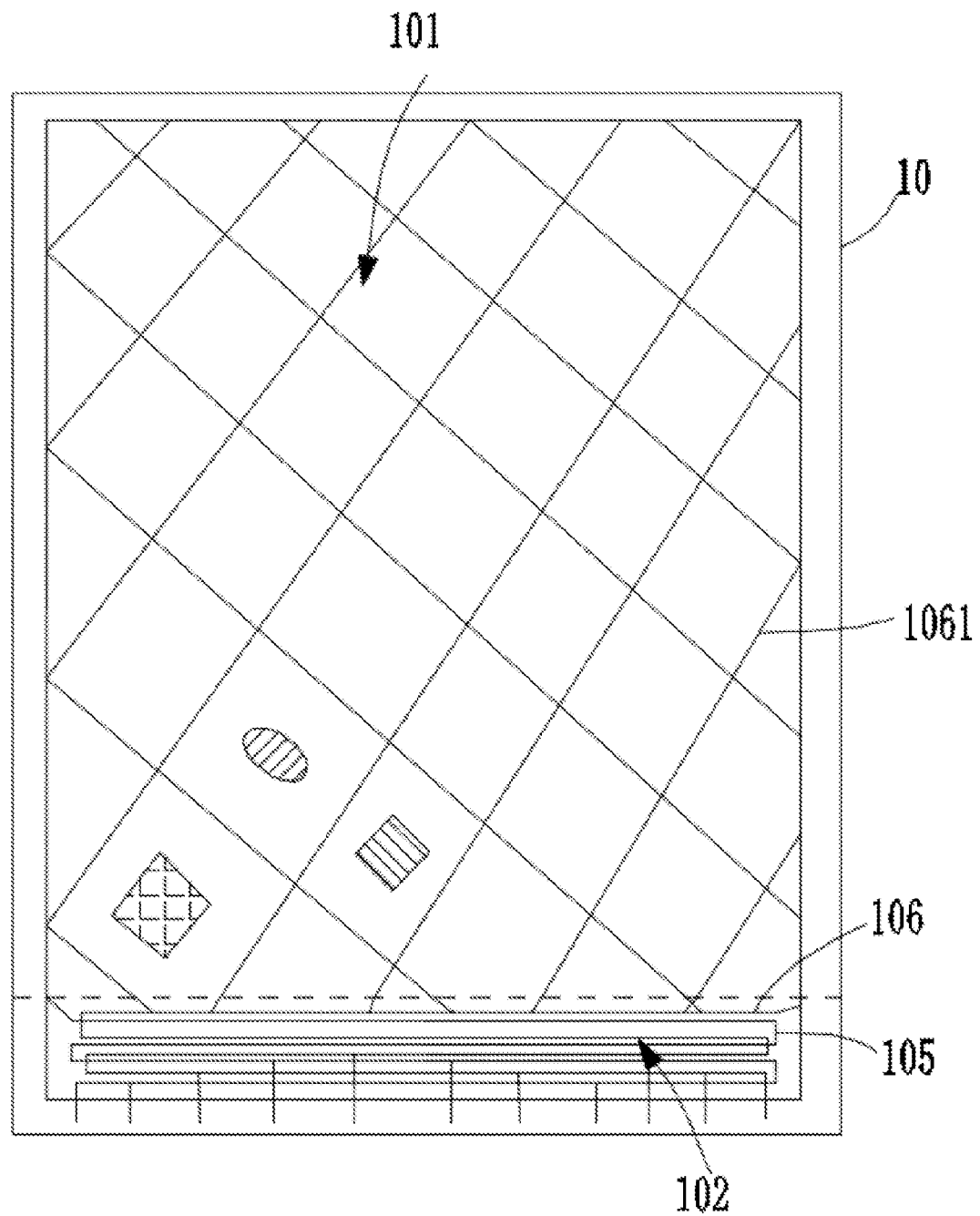
FIG. 1 is a schematic diagram of a plane structure of a display panel according to some embodiments of the present disclosure.

The following will be combined with the drawings in the embodiments of the present disclosure. The following disclosure provides different implementation methods or examples to achieve different structures of the present disclosure. In order to simplify the present disclosure, components and configurations of specific examples are described below. Furthermore, the examples of various specific processes and materials are provided by the present disclosure. Those of ordinary skilled in the art can be aware of applications of other processes. All other embodiments obtained by those skilled in the art without inventive effort are within the scope of the present disclosure.

In the description of the present disclosure, it is to be understood that the orientation or positional relationship indicated by the terms "center", "longitudinal", "transverse", "length", "width", "thickness", "up", "down", "front", "back", "left", "right", "vertical", "horizontal", "top", "bottom", "in", "out", "clockwise", "counterclockwise", and the like, is based on the orientation or positional relationship shown in the drawings, merely to facilitate description of the present disclosure and to simplify the description, and is not intended to indicate or imply that the device or element referred to must have a particular orientation, be constructed and operated in a particular orientation, and therefore is not to be construed as limiting the present disclosure. Furthermore, the terms "first" and "second" are used for descriptive purposes only and are not to be construed as indicating or implying relative importance or implying the number of indicated technical features.

With the continuous development of preparation technology of a display panel, requirements for performance and touch effect of a display panel are put forward.

A resistance value of a corresponding touch metal wiring within a touch layer directly affects the touch performance of the display panel. In existing art, a resistance value corresponding to a touch metal wiring of a prepared touch display panel is large. The touch effect is not ideal, a layout of the touch wiring is unreasonable, and an occupied region is large, which is detrimental to the design of a narrow frame display panel.

According to embodiments of the present disclosure, there are provided a display panel and a display device. By improving a wiring structure of the touch metal wiring within the touch display panel, the touch performance of the panel is effectively improved, and a narrow frame design of the display panel is realized.

As shown in FIG. 1, FIG. 1 is a schematic diagram of a plane structure of a display panel according to an embodiment of the present disclosure. The display panel 10 includes a display region 101 and a wiring region 102. Specifically, the wiring region 102 may be on a side of the display region 101. As in an embodiment of the present disclosure, the wiring region 102 may be in a bottom frame region of the display panel 10 in order to realize a narrow frame display panel. The display region 101 is used to display a display screen. There are multiple signal wirings of different types in the wiring region 102. In an embodiment of the present disclosure, different wirings are closely arranged. FIG. 1 is only a schematic diagram of the different wirings.

Specifically, the display panel 10 according to an embodiment of the present disclosure is a touch display panel. There are multiple touch electrodes within the display panel 10 in order to realize a touch function thereof. When a touch operation is performed, the touch signal of the display panel is transmitted by the touch electrode.

In an embodiment of the present disclosure, there may be a substrate, a first metal layer, and a second metal layer within the display panel. The first metal layer may be directly disposed on the substrate. The second metal layer may be disposed on a film layer corresponding to a side of the first metal layer away from the substrate. Therefore, the first metal layer and the second metal layer are disposed on two different film layers, respectively, and the first metal layer and the second metal layer are insulated. For example, there is an insulating layer between the first metal layer and the second metal layer, so as to prevent interference between two different touch layers. In an embodiment of the present disclosure, FIG. 1 only shows schematic diagram of a plane structure of the display panel, and a corresponding film layer structure diagram thereof may be according to a positional relationship between the first metal layer and the second metal layer, which is not described herein.

Figure 2:
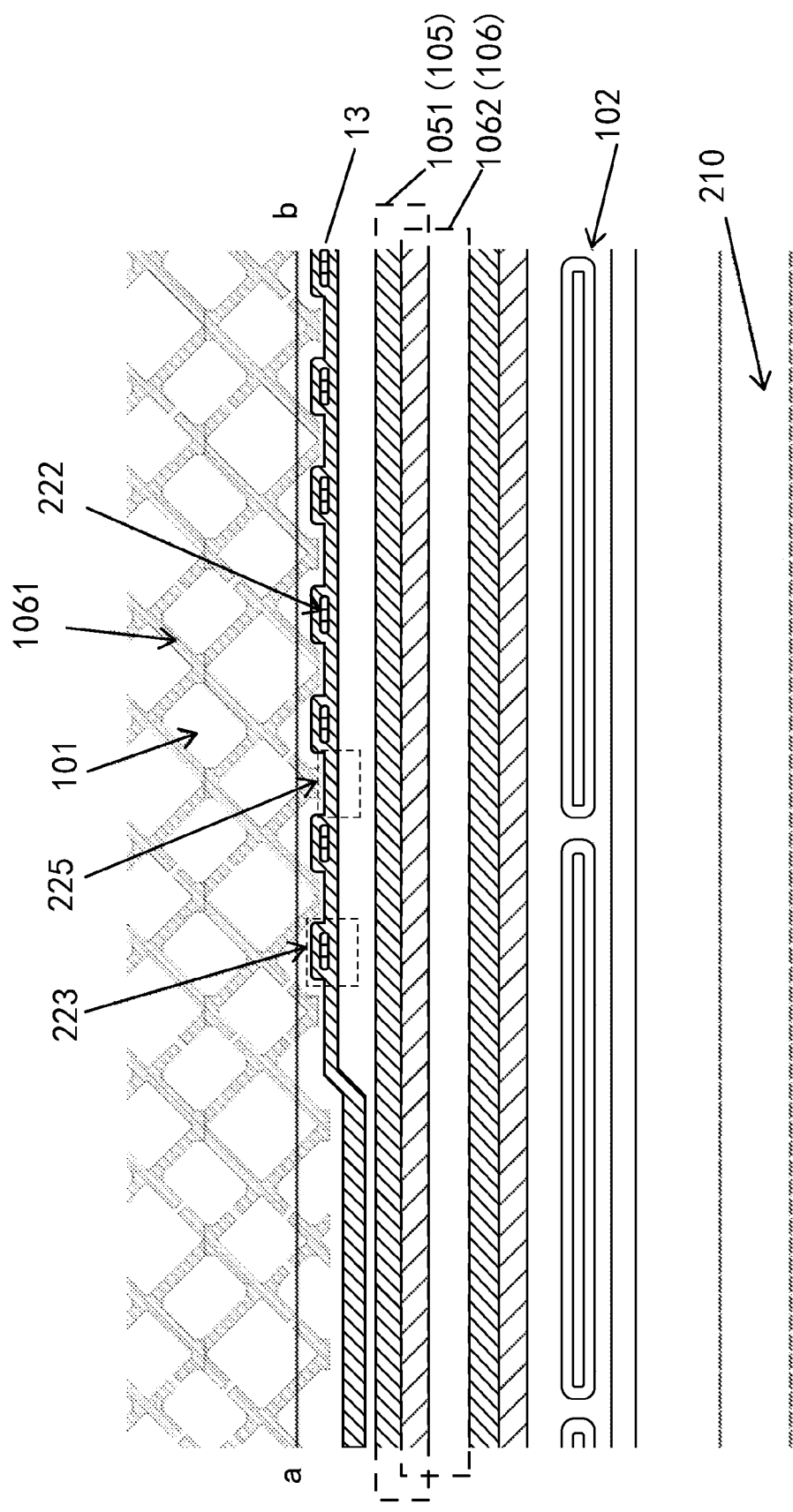
FIG. 2 is a schematic diagram of an arrangement of part of touch wiring corresponding to a display panel according to some embodiments of the present disclosure.

As shown in FIG. 2, FIG. 2 is a schematic diagram of an arrangement of part of a touch wiring corresponding to the display panel according to an embodiment of the present disclosure. Specifically, when a first touch wiring 105 is disposed on a first metal layer, the first touch wiring 105 may further include a first touch sub-wiring 1051 in a first direction. In following examples, the first direction is described by taking a horizontal direction on the first metal layer as an example.

Further, when the second metal layer in the embodiment of the present disclosure is provided, a touch electrode 1061 at least within the display region 101 is provided on the second metal layer. In an embodiment of the present disclosure, the touch electrode 1061 may be patterned, for example, as a grid touch electrode.

There are multiple second touch wirings 106 and a first via hole 222 within the wiring region 102. Each of the second touch wirings 106 is electrically connected to one corresponding touch electrode, and each of the first touch wiring 105 is electrically connected to one corresponding touch electrode through the first via hole 222.

It should be noted that, in a mutual capacitive touch mode, each column of touch electrodes in the second metal layer are electrically connected to each other, and are electrically connected to a first touch wiring or a second touch wiring (for example, a first column of touch electrodes are electrically connected to a first touch wire, a second column of touch electrodes are electrically connected to a second touch wire, and later columns of touch electrodes are alternately electrically connected to the first touch wiring or the second touch wire). Thus the first touch sub-wiring 1051 of the first touch wiring and the second touch sub-wiring 1062 of the second touch wiring can partially overlap in a direction perpendicular to the substrate when being arranged in the first direction, so as to compress a wiring space of the wiring region 102, thereby realizing a design of a narrow frame.

Specifically, in an embodiment of the present disclosure, each of the second touch wirings 106 is electrically connected to one corresponding touch electrode 1061. Each of the first touch wirings 105 is electrically connected to one corresponding touch electrode 1061 through the first via hole 222.

In an embodiment of the present disclosure, each of the second touch wirings 106 further includes the second touch sub-wiring 1062 in a first direction. The first touch sub-wiring 1051 is disposed in the same direction as the second touch sub-wiring 1062, and the first touch sub-wiring 1051 at least partially overlaps with adjacent second touch sub-wiring 1062. In an embodiment of the present disclosure, the first touch sub-wiring 1051 and the second touch sub-wiring 1062 partially overlap within the wiring region 102, so that a projection of the second touch sub-wiring 1062 partially overlaps with the first touch sub-wiring 1051, thereby shortening the layout width and region occupied within the wiring region, and realizing the design of the narrow frame.

Further, when the touch electrode 1061 in the embodiment of the present disclosure is provided, the touch electrode 1061 extends into the wiring region 102, and at least part of the touch electrode 1061 further includes a touch metal side edge 13 on a side near the wiring region. For example, the touch metal side edge 13 is disposed at an edge position on a side of the wiring region 102 near the display region.

In an embodiment of the present disclosure, the first via hole 222 at least partially overlaps with a touch metal side edge 13 of a corresponding touch electrode, so that the first via hole 222 can expose part of the touch electrode to be electrically connected to other wiring. Meanwhile, the first via hole 222 is disposed on a side of a corresponding touch metal side edge 13 near the display region, and the first via hole 222 does not exceed the wiring region corresponding to the touch metal side edge 13. For example, the first via hole 222 does not exceed a line ab between the wiring region and the display region, and the first via hole 222 does not exceed a boundary of wirings on a side of the touch metal side edge 13 near the display region. That is, the first via hole 222 is completely disposed on the wiring of the touch metal side edge 13.

Further, in an embodiment of the present disclosure, when the touch metal side 13 is provided, the touch metal side 13 may further include a first metal cladding part 223 and a metal side edge part 225. Specifically, the first metal cladding part 223 is corresponding the first via hole 222, for example, the first metal cladding part 223 completely surrounds the first via hole 222, and the metal side edge part 225 is correspondingly between two first metal cladding parts 223, and a width of the first metal cladding part 223 is greater than a width of the metal side edge part. Therefore, the quality of the metal side edge is improved, and a problem that the metal wiring easily breaks at the first via hole 222 is effectively prevented.

Further, in an embodiment of the present disclosure, the first metal cladding part 223 is on a side of the corresponding touch metal side edge 13 near the display region, and does not exceed the touch metal side edge 13 towards the wiring region. For example, the first metal cladding part 223 is at an edge of the wiring region.

In an embodiment of the present disclosure, when the first touch wiring 105 is provided, the first touch wiring 105 and the second touch wiring 106 are correspondingly and are on two different film layers respectively. So, at a position of a structure corresponding to the first metal cladding part 223, the first touch wiring 105 further includes a second metal cladding part 323 corresponding to the first via hole 222 and a metal side edge part. The second metal cladding part 323 corresponds to the first metal cladding part 223, for example, an orthographic projection of the first metal cladding part 223 on the substrate overlaps an orthographic projection of the second metal cladding part 323 on the substrate, and a width of the second metal cladding part 323 is greater than that of the metal side edge part.

At the same time, in a vertical projection direction of the substrate, the second metal cladding part is on a side of the corresponding touch metal side edge 13 near the display region and does not exceed a side of the touch metal side edge towards the wiring region. That is, the second metal cladding part is at an edge on a side of the wiring region near the display region.

Referring to FIG. 2, in this display region 101, a touch electrode 1061 is a grid touch electrode to prevent the touch wiring from shielding the light-emitting pixels as much as possible, thereby achieving a high display quality.

Further, since the first touch wiring 105 and the second touch wiring 106 according to an embodiment of the present disclosure are at different regions and positions, in FIG. 2, the display region 101 is above the line ab, and the wiring region 102 is below the ab line.

A sealing retaining wall 210 is within the wiring region 102. The sealing retaining wall 210 may be a convex-concave sealing structure, and the first touch wiring 105 and the second touch wiring 106 are between the line ab and the sealing retaining wall 210. Corresponding film layers in the display region 101 and the wiring region 102 of the display panel are sealed by the sealing retaining wall, thereby ensuring the normal operation and reliability of the display panel.

Further, in an embodiment of the present disclosure, when various touch wiring are provided, corresponding to the first touch wiring 105, various first touch wirings 105 are arranged from a side of the wiring region 102 near the display region 101 towards a bottom frame of the display panel in sequence.

When multiple first touch sub-wirings 1051 are arranged, there is a certain distance between adjacent first touch sub-wirings 1051. A distance between two adjacent first touch sub-wirings 1051 may be greater than 10 um, or may be set according to different types of products, which is not described herein.

Further, when the second touch sub-wiring 1062 according to an embodiment of the present disclosure is provided, an orthographic projection of the first touch sub-wiring 1051 within the wiring region overlap with an orthographic projection of the second touch sub-wiring 1062. For example, the orthographic projection of the first touch sub-wiring 1051 on the second touch sub-wiring 1062 overlaps with the second touch sub-wiring 1062. Alternatively, the orthographic projection of the second touch sub-wiring 1062 may be between two adjacent first touch wirings 1051 and may overlap with the first touch sub-wiring 1051.

In an embodiment of the present disclosure, at a position corresponding to the first via hole 222, an aperture of the first via hole 222 is less than a wiring width of a corresponding touch metal side edge 13. A cladding structure of a certain width is provided around the first via hole 222. Thus, by improving arrangement positions and connection modes of different touch wiring, the touch effect is effectively improved, and the narrow frame display panel is realized.

Figure 3:
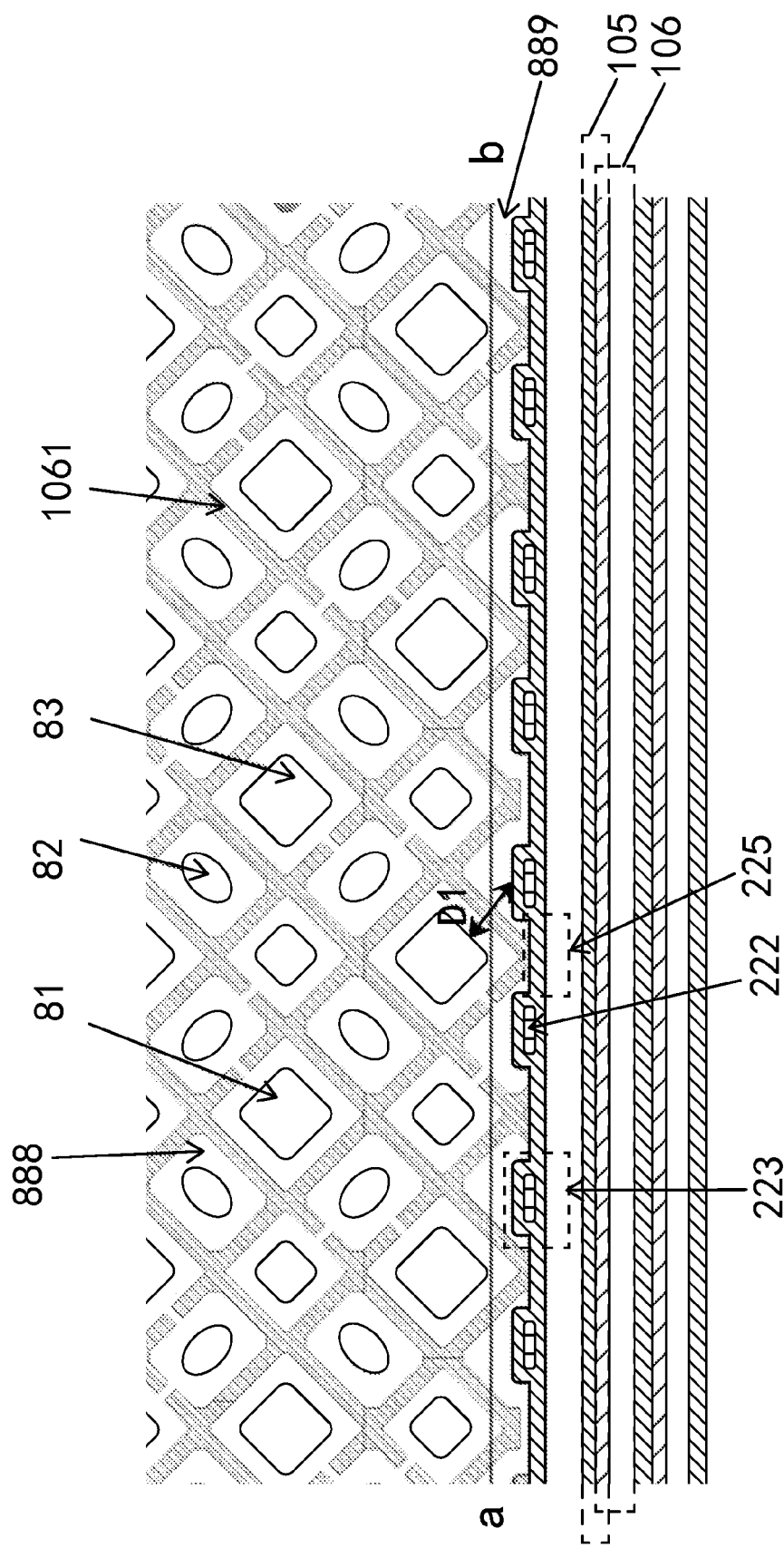
FIG. 3 is a schematic diagram of part of a touch wiring of the display panel according to some embodiments of the present disclosure.

As shown in FIG. 3, FIG. 3 is a schematic diagram of part of touch wirings of the display panel according to an embodiment of the present disclosure. In an embodiment of the present disclosure, when the first via hole 222 and the first metal cladding part 223 corresponding to the touch metal side edge 13 are provided, the first via hole 222 may be disposed symmetrically with respect to a geometric center of the first metal cladding part 223.

In an embodiment of the present disclosure, a shape of the first metal cladding part 223 may be set as a rectangle, a square, an oval or other structure, and the corresponding first via hole 222 may be set as a rectangle, a square, an oval or other structure. Specific settings may be according to different products, which is not described herein.

Referring to the structure of FIG. 3, in an embodiment of the present disclosure, the touch electrode 1061 includes multiple grid openings. Specifically, the grid openings include a first grid opening 888 within the display region 101, and a second grid opening 889 within the wiring region 102. The first grid opening 888 may be near a side of the wiring region, and the second grid opening 889 may be disposed near a side of the display region 101. In an embodiment of the present disclosure, the first grid opening 888 and the second grid opening 889 may has a same size, or an opening size of the second grid opening 889 may be less than an opening size of the first grid opening 888. At the same time, both the first grid opening 888 and the second grid opening 889 are formed by the touch electrode 1061, and the touch metal side edge 13 corresponds to the second grid opening 889.

Further, light-emitting sub-pixels are correspondingly provided within each first grid opening 888. For example, in different first grid openings 888, red sub-pixels 82, blue sub-pixels 81, and green sub-pixels 83 are provided.

Referring to FIG. 3, in an embodiment of the present disclosure, the first metal cladding part 223 is correspondingly within the second grid opening 889, for example, in middle of the second grid opening 889. A width of the first metal cladding part 223 is greater than a width of the metal side edge part. Therefore, in an embodiment of the present disclosure, a width of a bottom wiring region is effectively reduced by providing the first metal cladding part 223 within the second grid opening 889.

Specifically, when the first metal cladding part 223 is within the second grid opening 889, in order to avoid a short circuit problem between different touch wirings and further reduce the width of the wiring region of the display panel, in an embodiment of the present disclosure, a minimum distance between the first metal cladding part 223 and an adjacent light-emitting sub-pixel is set to be greater than or equal to 15 um. Specifically, a distance D1 between the first metal cladding part 223 and a blue sub-pixel 81 is set to be greater than 15 um. For example, the distance D1 may be set to 17 um or 18 um. Thus, the width of the wiring region is reduced as much as possible, and the touch performance of the display panel is ensured.

Figure 4:
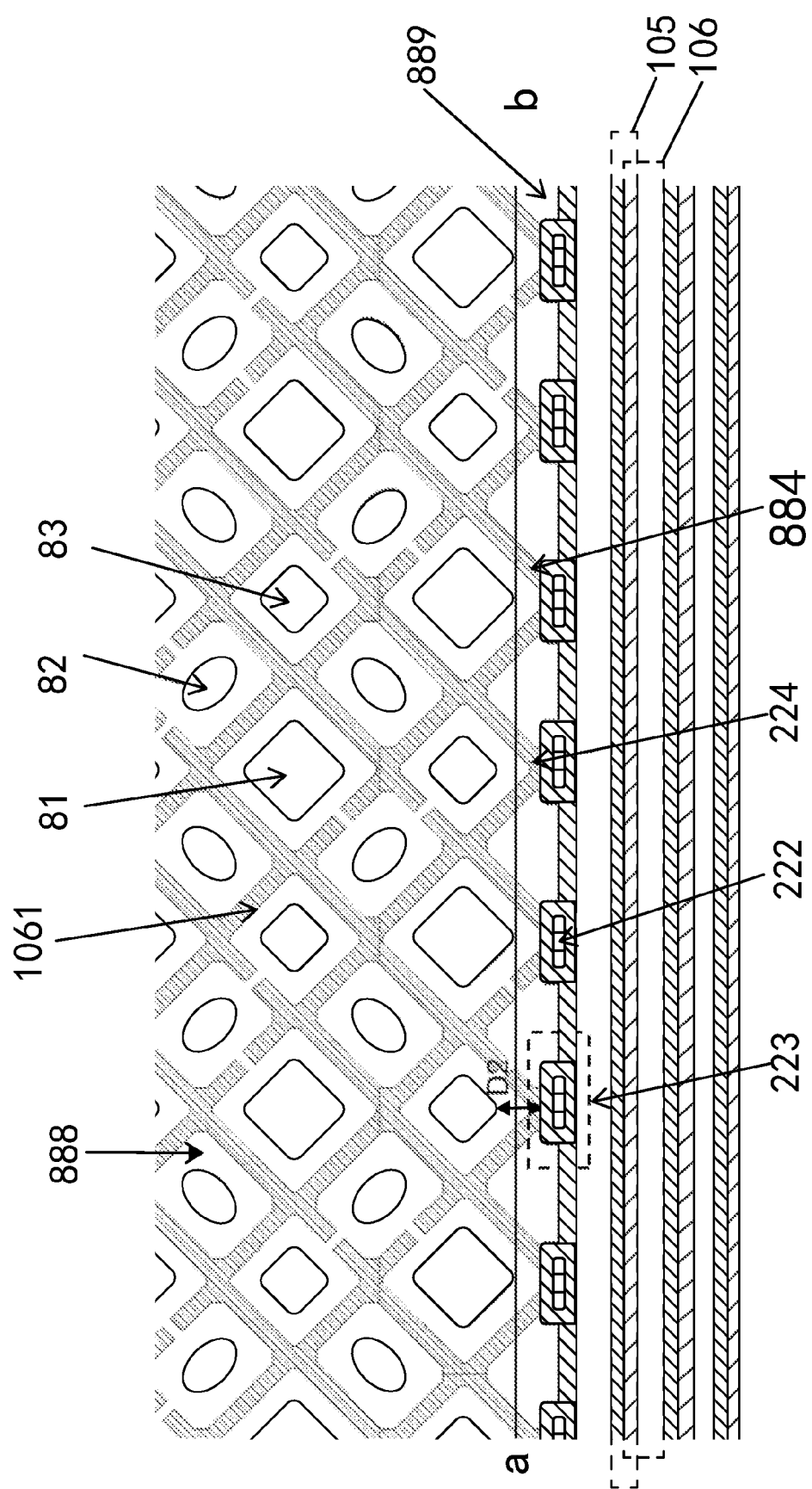
FIG. 4 is a schematic diagram of another a touch wiring according to some embodiments of the present disclosure.

Referring to FIG. 4, FIG. 4 is a schematic diagram of another wiring of a touch wiring according to an embodiment of the present disclosure. In an embodiment of the present disclosure, the first metal cladding part 223 may also be correspondingly provided at a grid intersection point 224 between adjacent second grid openings 889. In an embodiment of the present disclosure, the first metal cladding part 223 is at the grid intersection point 224 to further design a wiring structure in the wiring region and realize a narrow frame.

In an embodiment of the present disclosure, the display panel may further include a light-emitting layer. The light-emitting layer may be disposed at a corresponding position between the substrate and the first metal layer, and the light-emitting layer includes multiple light-emitting pixels. At the same time, when the touch electrode 1061 is provided, the touch electrode 1061 includes a pixel opening corresponding to a light-emitting pixel, such as the second grid opening 889, and a touch sensing part 884 between the second grid openings 889. The touch sensing part 884 is electrically connected to the touch metal side edge 13.

At the same time, the first via hole 222 is correspondingly provided at an electrical connection point between the touch sensing part 884 and the touch metal side edge 13. In an embodiment of the present disclosure, the first via hole 222 is disposed at the electrical connection point. The electrical connection point is a grid intersection 224. Thus, the arrangement position between the different wirings is further reduced, and the design of the narrow frame is realized. Alternatively, the first via hole 222 and the adjacent touch sensing part 884 are disposed at intervals.

Specifically, when the first via hole 222 is disposed at the electrical connection point, a minimum distance between the first metal cladding part 223 and a corresponding light-emitting sub-pixel is set to be greater than or equal to 9.8 um, thereby preventing a problem of mutual interference between the first metal cladding part 223 and the light-emitting sub-pixel. For example, a distance D2 between the first metal cladding part 223 and a corresponding green sub-pixel 83 thereabove is set to be greater than 9.8 um. Specifically, the distance D2 may be set to 10 um or 11 um. Or the distance D2 is set according to actual requirements, thereby realizing a narrow frame of the display panel.

Figure 5:
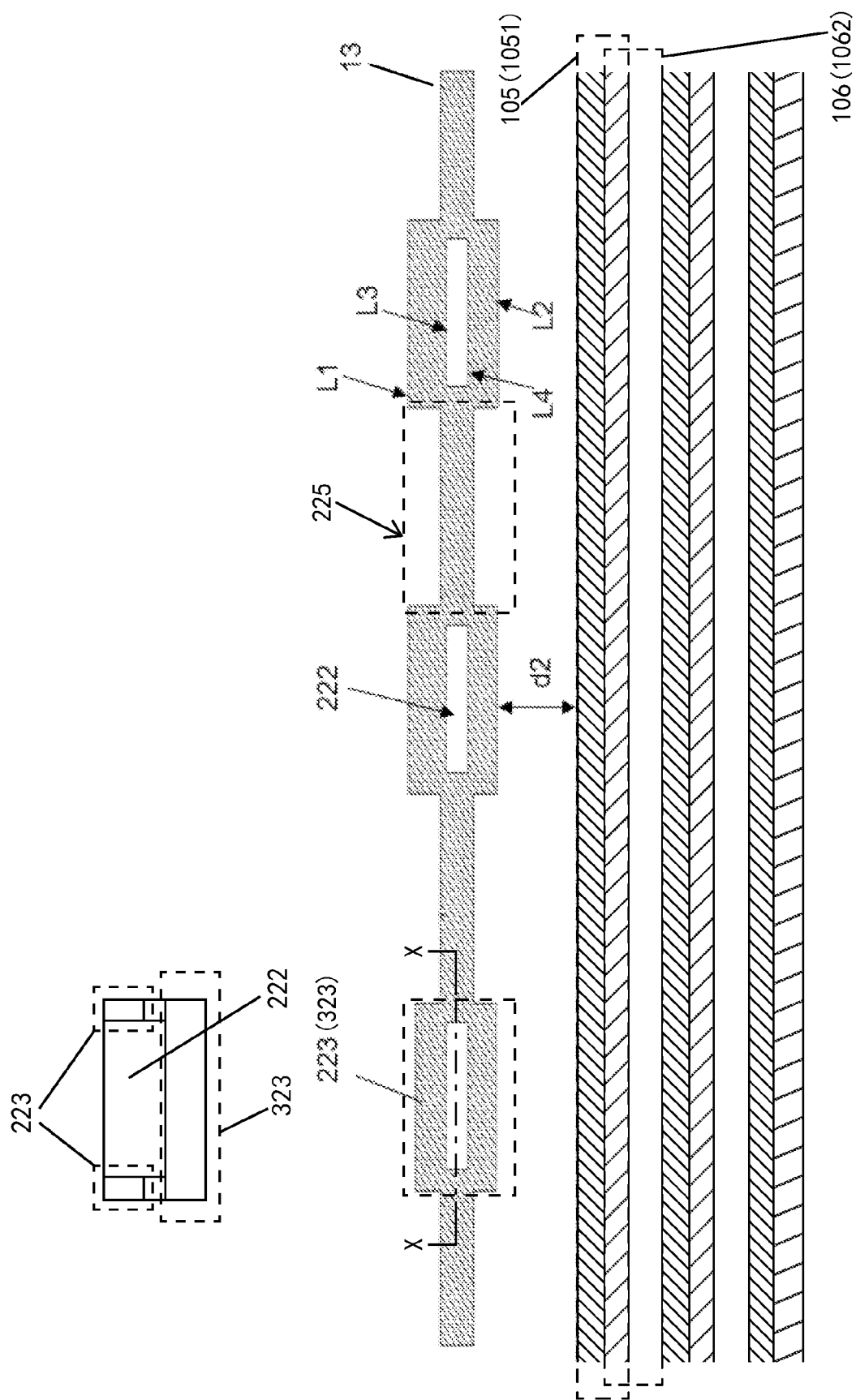
FIG. 5 is a structural schematic diagram of a side edge of the touch metal according to some embodiments of the present disclosure.

As shown in FIG. 5, FIG. 5 is a structural schematic diagram of a touch metal side edge according to an embodiment of the present disclosure. In conjunction with the structure in FIGS. 3-4, when the touch metal side edge 13 and a corresponding first via hole 222 are provided, the first metal cladding part 223 may be symmetrically disposed with respect to a central axis of the touch metal side edge 13, and the first via hole 222 may be symmetrically disposed with respect to a geometric center of the first metal cladding part 223.

In an embodiment of the present disclosure, an aperture or a width of the first via hole 222 is less than a width of the corresponding first metal cladding 223. At the same time, the width of the first metal cladding part 223 is greater than a width of a corresponding metal side edge part 225.

Specifically, the first metal cladding part 223 includes a first outer edge L1 in a first direction, a second outer edge L2 opposite to the first outer edge L1, a first inner edge L3 near the first via hole 222, and a second inner edge L4 opposite to the first inner edge L3.

In an embodiment of the present disclosure, at least one of the first outer edge L1 and the second outer edge L2 is not collinear with a side edge of the metal side edge part 225. For details, please refer to a structure of the via hole shown in FIG. 5. At this time, neither the first outer edge L1 nor the second outer edge L2 is collinear with a side edge of a corresponding metal side edge part 225. The first outer edge L1 and the second outer edge L2 may be arranged parallel to the side edge of the corresponding metal side edge part 225. In an embodiment of the present disclosure, a minimum distance between the first metal cladding part 223 and a second touch sub-wiring 1062 of an adjacent second touch wiring 106 is greater than or equal to 10 um. Alternatively, a distance between the first metal cladding part 223 and the second touch sub-wiring 1062 is set to be 15 um or 17 um. Therefore, the narrow frame of the panel is realized while ensuring no mutual interference between different wiring.

Figure 6:
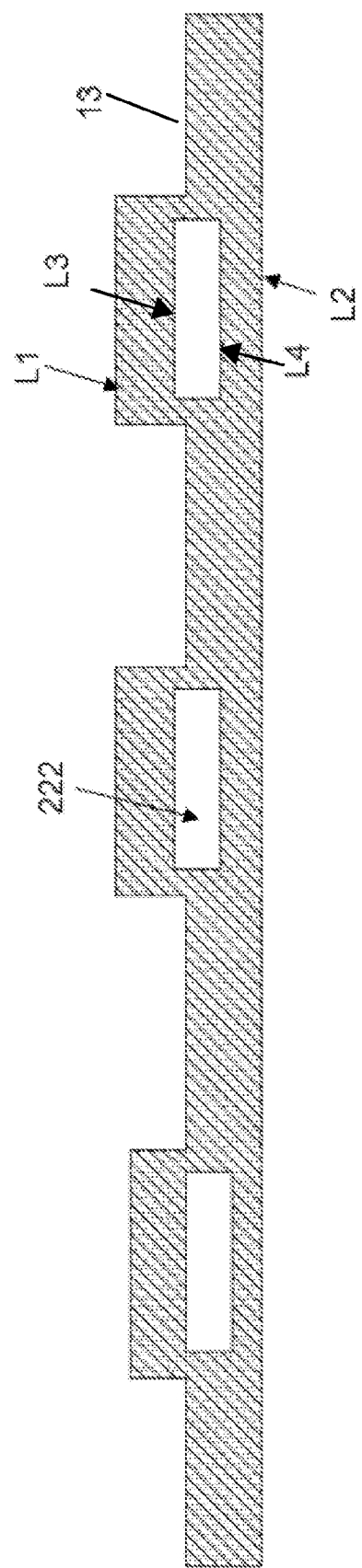
FIG. 6 is a structural schematic diagram of another first metal cladding part according to some embodiments of the present disclosure.

Further, as shown in FIG. 6, FIG. 6 is a structural schematic diagram of another first metal cladding part according to an embodiment of the present disclosure. In conjunction with the structure in FIG. 5, in an embodiment of the present disclosure, when the first metal cladding part 223 is provided, the second outer edge L2 of the first metal cladding part 223 is collinear with the side edge of the corresponding metal side edge part, and the first outer edge L1 is not collinear with the side edge of the corresponding metal side edge part.

Alternatively, the structures of FIG. 5 and FIG. 6 may be mixed according to actual requirements. Two different kinds of first metal cladding parts 223 may be arranged alternately in sequence, so that the touch wiring has good symmetry and the touch effect of the touch panel is ensured.

In an embodiment of the present disclosure, the first metal cladding part 223 is disposed at a position corresponding to the first via hole 222, so that effectively ensuring that the touch wirings in two different layers can have a good connection effect with the touch metal side edge, effectively reducing the resistance of the touch metal wiring, and improving the touch effect thereof.

Further, in an embodiment of the present embodiment, when the first metal cladding part 223 and the corresponding metal side edge part 225 are provided, a ratio of the width of the first metal cladding part 223 to a width of the metal side edge part 225 is in a range of 1.5-2, and a ratio between the width of the first metal cladding part 223 and a width of the first via hole 222 is in a range of 3-4.

Figure 7:
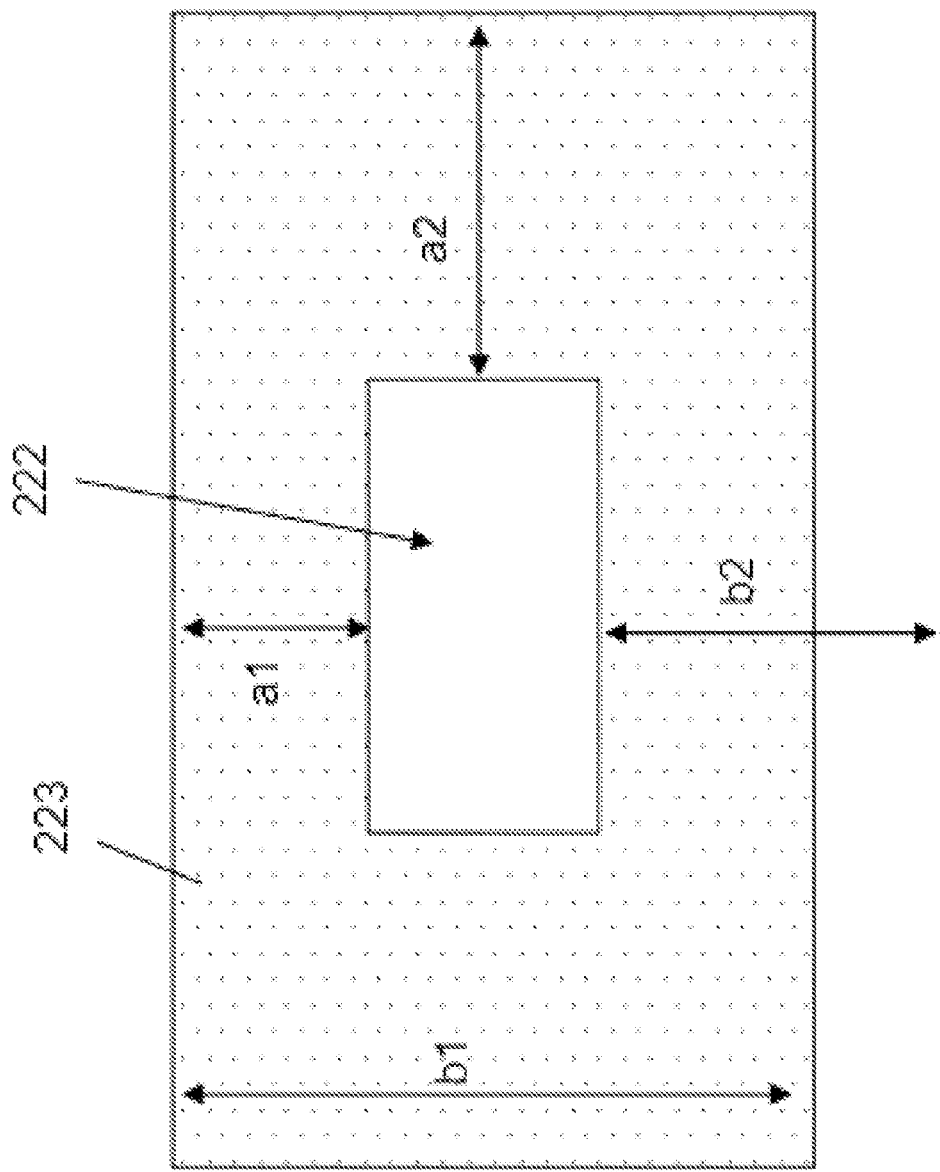
FIG. 7 is a schematic diagram of structural parameters of a touch metal side edge according to some embodiments of the present disclosure.

Referring to FIG. 7, FIG. 7 is a schematic diagram of structural parameters of a touch metal side according to an embodiment of the present disclosure. In conjunction with the structure in FIG. 6, in an embodiment of the present disclosure, when the first metal cladding part 223 is provided, the width b1 of the first metal cladding part 223 may be set to 7 um-10 um. Alternatively, the width b1 is set to 9 um, and the width of the metal side edge is set to 4.5 um. Correspondingly, the width of the first via hole 222 may be set to 3 um.

At the same time, a distance b2 between a bottom edge of the first via hole 222 within the first metal cladding part 223 and the touch sub-wiring below the first metal cladding part 223 may be set to 20 um-26 um. Alternatively, the distance b2 may be set to 24 um. At the same time, in a width direction, a width a1 between the outer side edge of the first metal cladding part 223 and the first via hole 222 is set to 1.8 um-5 um. Alternatively, the width a1 is set to 3.5 um. Further, in a length direction of the first metal cladding part 223, a distance a2 between a side edge of the first metal cladding part 223 and an inner edge of the first via hole 222 is set to 3 um-5 um. Alternatively, the distance a2 is set to 4 um.

In an embodiment of the present disclosure, the first metal cladding part 223 and the first via hole 222 are provided, the first via hole 222 is completely surrounded by the touch wiring, and a metal cladding edge part having a certain width is formed, thereby effectively preventing breakage of the touch wiring, and improving the overall performance of the display panel.

Figure 8:
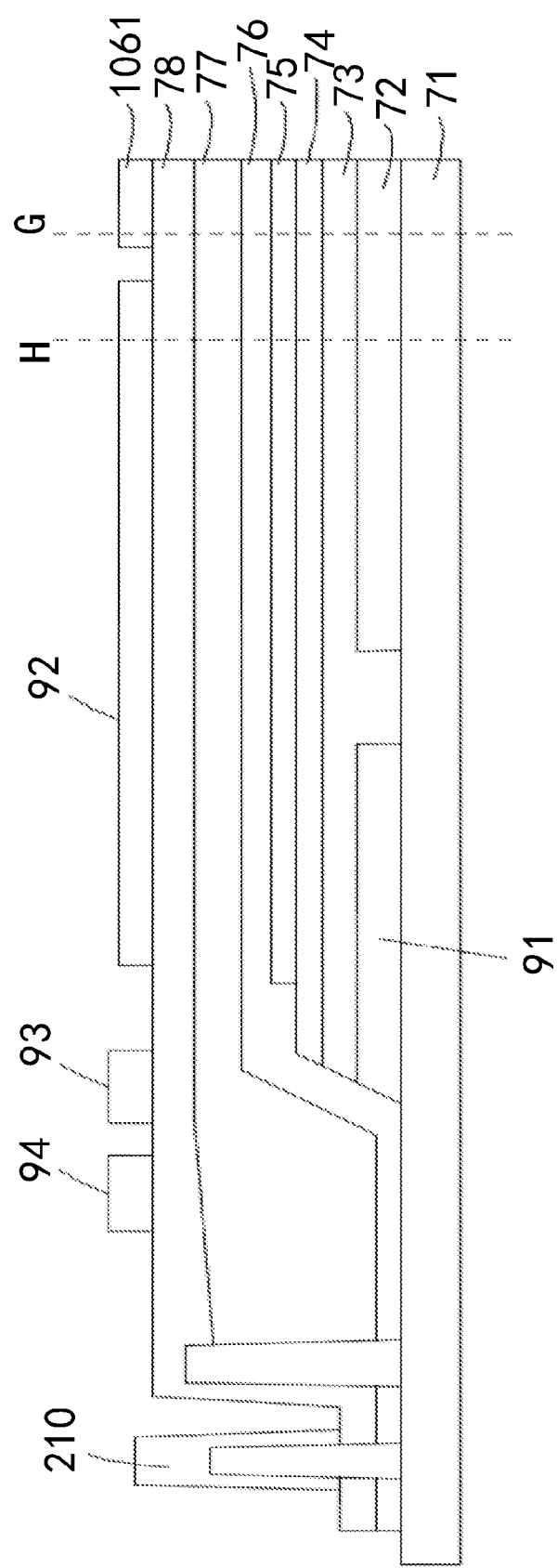
FIG. 8 is a structural schematic diagram of a film layer corresponding to the display panel according to some embodiments of the present disclosure.

Further, as shown in FIG. 8, FIG. 8 is a schematic diagram of a structure of a film layer according to a display panel according to an embodiment of the present disclosure. Planar wiring schematic diagrams in FIG. 1-FIG. 7 are combined. In an embodiment of the present disclosure, the display panel includes a substrate 71 disposed, a VDD line 72 on the substrate 71, a VSS line 91 on a same layer as the VDD line 72, a planarization layer 73 on the VDD line 72 and the VSS line 91, a pixel definition layer 74 on the planarization layer 73, and an electrode 75 on the pixel definition layer 74.

The display panel further includes a sealing layer 76 on the electrode 75, an inorganic printing layer 77 on the sealing layer 76, a passivation layer 78 on the inorganic printing layer 77, a touch electrode 1061, a touch wiring 92, a ground (GND) wiring 93, and a PCD wiring 94. The touch electrode 1061, touch wiring 92, GND wiring 93, and PCD wiring 94 are on the passivation layer 78.

In an embodiment of the present disclosure, the display panel further includes a sealing retaining wall 210 disposed in the wiring region. Via holes on the first touch wiring and the second touch wiring are provided at corresponding positions between a dashed line H and a dashed line G. The right side of the dashed line G is the display region of the display panel, and the left side of the dashed line G is the wiring region of the display panel. In conjunction with the wiring structure in FIG. 1 to FIG. 7, in an embodiment of the present disclosure, the via hole is at a side of the wiring region near the display region. Therefore, the narrow frame design of the display panel is realized as much as possible.

Figure 9:
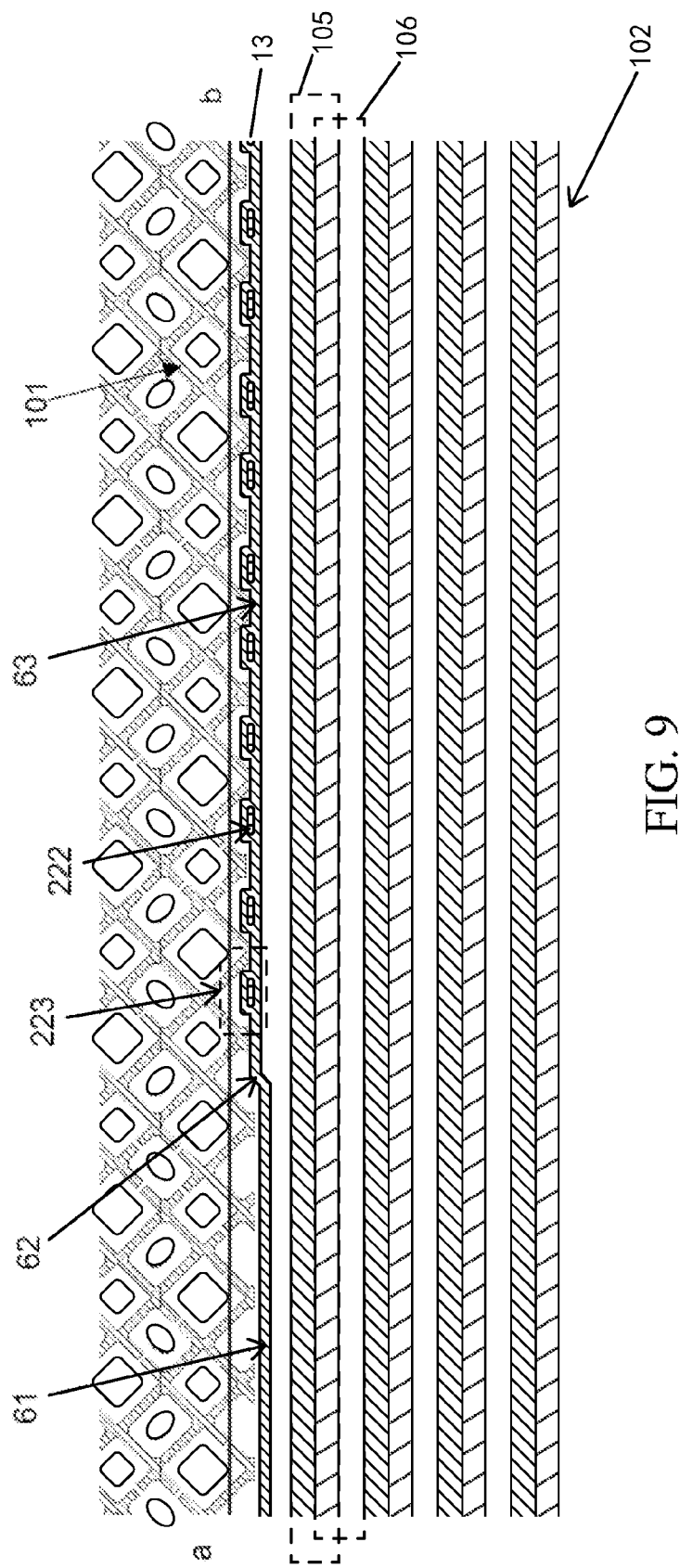
FIG. 9 is a schematic diagram of an arrangement of a touch wiring of the display panel according to some embodiments of the present disclosure.

As shown in FIG. 9, FIG. 9 is a schematic diagram of an arrangement of touch wiring of a display panel according to an embodiment of the present disclosure. In conjunction with the wiring structure in FIG. 2, in an embodiment of the present disclosure, the touch metal side edge 13 includes a first flat section 61, a transition section 62, and a second flat section 63.

Two ends of the transition section 62 are connected to the first flat section 61 and the second flat section 63, respectively. At the same time, the first flat section 61 is at a corresponding position in middle of the wiring region of the display panel, and the second flat section 63 is at a corresponding position on a side edge of the wiring region 102. In an embodiment of the present disclosure, FIG. 9 is only a wiring schematic diagram of a right half of the wiring. For the entire display panel, it further includes wiring on a left side. Thus, a complete wiring structure is formed.

In an embodiment of the present disclosure, a length of the first flat section 61 is greater than a length of the second flat section 63, and a wiring width of the first flat section 61 is greater than a wiring width of the second flat section 63 and a wiring width of the transition section 62.

In an embodiment of the present disclosure, the first metal cladding part 223 and the corresponding first via hole 222 are provided at a corresponding position of the second flat section 63. At the same time, the wiring width of the first flat section 61 is greater than the wiring width of the second flat section 63, and a vertical distance between the first flat section 61 and bottom of the wiring region 102 is less than a distance between the second flat section 63 and bottom of the wiring region 102. At the same time, a distance between the first flat section 61 and an adjacent first touch wiring is greater than a distance between the second flat section 63 and adjacent first touch wiring. In this way, on both sides of the wiring region 102, more space can be reserved between different wirings, thereby preventing a problem of short circuit in adjacent touch wiring. At the same time, other signal wiring may be provided in the above space, and a narrow frame of the display panel can be realized.

In an embodiment of the present disclosure, the wiring structure of the wiring region 102 is improved, and a distance between a corresponding first metal cladding part on the touch metal side edge and the touch wiring below the first metal cladding part is increased, so that the risk of short circuit between two metal wirings can be eliminated. At the same time, a large space may be reserved for moving up the touch wiring in all touch layers below, or an overlapping design may be used, so as to further reduce the width of the wiring region of the display panel, and realize the design of the narrow frame display panel.

Figure 10:
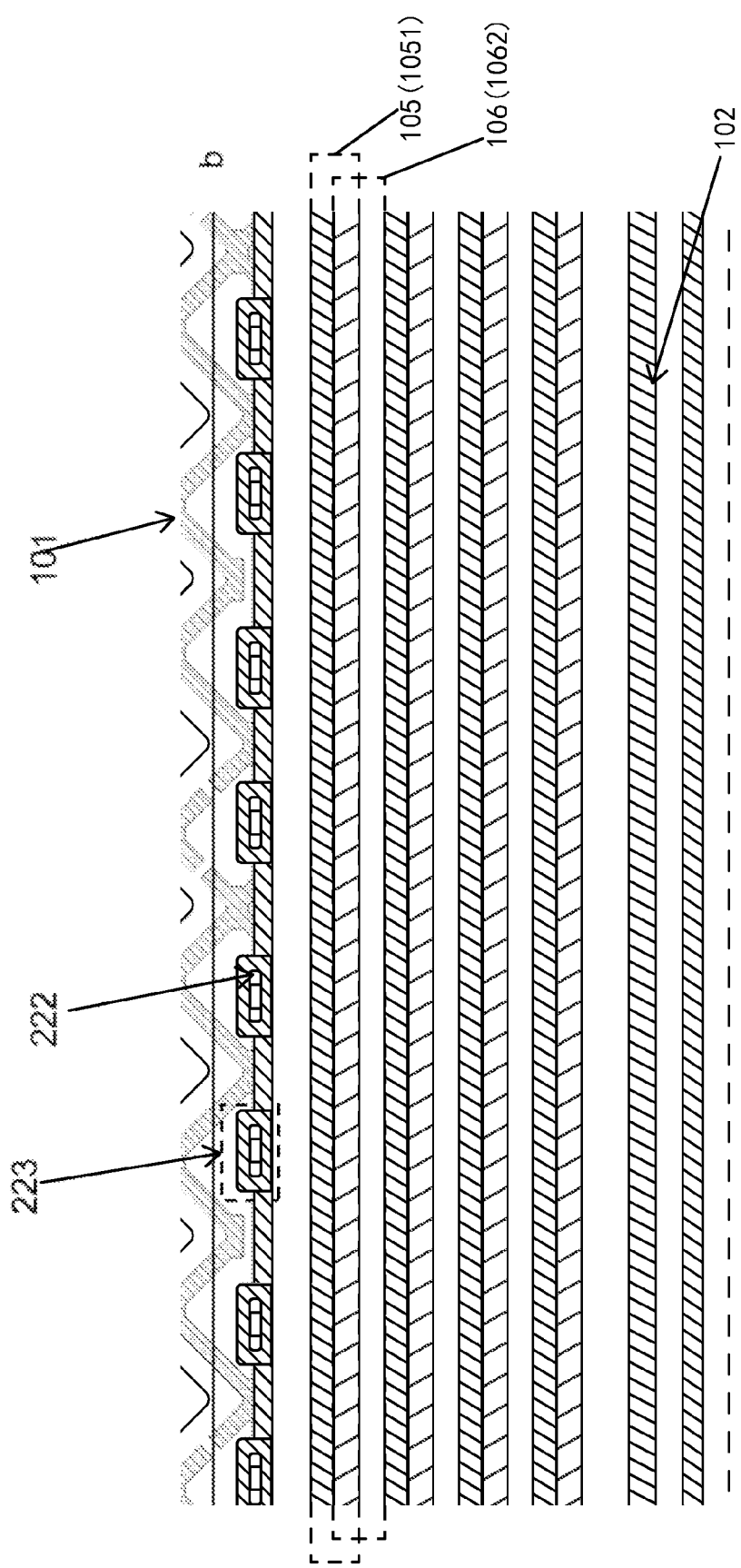
FIG. 10 is a schematic diagram of a wiring of the display panel according to some embodiments of the present disclosure.

Further, as shown in FIG. 10, FIG. 10 is a wiring schematic diagram of a display panel according to an embodiment of the present disclosure. In conjunction with the wiring structure in FIG. 2 to FIG. 8, in an embodiment of the present disclosure, at corresponding positions below the first metal cladding part 223, multiple parallel-arranged first touch sub-wirings 1051 corresponding to the first touch wirings 105 and multiple parallel-arranged second touch sub-wirings 1062 corresponding to the second touch wirings 106 are arranged in a first direction.

Specifically, the first touch sub-wiring 1051 and the second touch sub-wiring 1062 are in parallel, and are on the first metal layer and the second metal layer respectively. In an embodiment of the present disclosure, an orthographic projection of the first touch sub-wiring 1051 is at a corresponding position between an adjacent second touch sub-wiring 1062, and partially overlaps with the second touch sub-wiring 1062. For example, the orthographic projection of the first touch sub-wiring 1051 covers part of adjacent two second touch sub-wirings 1062, and partially overlaps with one or two second touch sub-wirings 1062. In this way, the width of the wiring region 102 can be further reduced, and a narrow frame design of the display panel can be realized.

Figure 11:
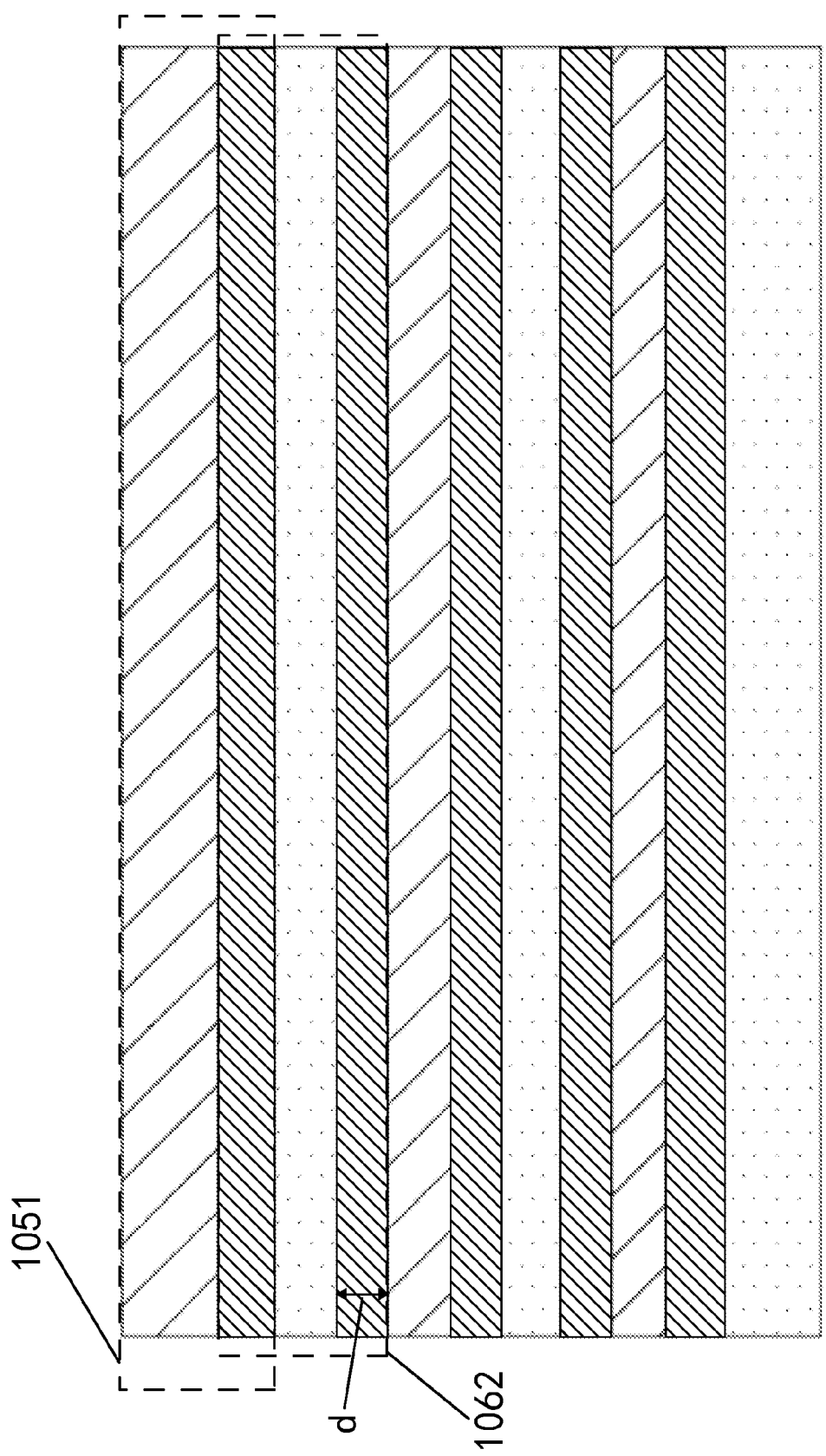
FIG. 11 is a wiring plane view of a first touch sub-wiring and a second touch sub-wiring according to some embodiments of the present disclosure.

As shown in FIG. 11, FIG. 11 is a wiring plane view of a first touch sub-wiring and a second touch sub-wiring according to an embodiment of the present disclosure. In conjunction with the wiring structure in FIG. 10, in an embodiment of the present disclosure, the orthographic projection of the first touch sub-wiring 1051 partially overlaps with the orthographic projection of the second touch sub-wiring 1062. A width of a region where the two projections overlap is d. In an embodiment of the present disclosure, the first touch sub-wiring 1051 and the second touch sub-wiring 1062 are near a bottom region of the wiring region 102. In an embodiment of the present disclosure, since different touch wirings corresponding to different sensing units overlap, the touch noise is large, and the touch sensitivity is reduced. In an embodiment of the present disclosure, in order to prevent the influence of the overlapped region on the touch performance, when the different touch wirings are provided, the width d of the overlapped region is less than or equal to 0.2 um. Preferably, the width d of the overlapped region may be set to 0.15 um, so that the touch noise is effectively reduced, the touch sensitivity is improved, and the design of the narrow frame is realized.

Further, according to an embodiment of the present disclosure, a display device includes the display panel according to an embodiment of the present disclosure. The display panel has high touch sensitivity, and the display panel is a touch display panel and a narrow frame display panel.

In an embodiment of the present disclosure, the display panel and the display device may be any product or component having a display function and a touch function, such as a mobile phone, a computer, an electronic paper, or a display, and a specific type thereof is not specifically limited.

In view of the foregoing, a display panel and a display device according to an embodiment of the present disclosure have been described in detail. The principles and embodiments of the present disclosure have been described using specific examples. The description of the above embodiments is merely intended to assist in understanding the technical solution and the core idea of the present disclosure. Although the present disclosure has been described in terms of preferred embodiments, the foregoing preferred embodiments are not intended to limit the present disclosure. Those skilled in the art may make various changes and modifications without departing from the spirit and scope of the present disclosure, and therefore the scope of the present disclosure is based on the scope defined in the claims.

What is claimed is:

1. A display panel, having a display region and a wiring region on a side of the display region, the display panel comprising:
   a substrate;
   a first metal layer disposed on the substrate, wherein the first metal layer comprises a plurality of first touch wirings disposed in the wiring region;
   a second metal layer disposed on a side of the first metal layer away from the substrate, wherein the second metal layer comprises a plurality of touch electrodes disposed at least in the display region, a touch metal bar extending in a first direction in the wiring region and disposed near the display region, and a plurality of second touch wirings disposed in the wiring region,
   wherein each of the second touch wirings is electrically connected to one of the touch electrodes, and at least part of the touch electrodes are electrically connected to the touch metal bar;
   the touch metal bar is provided with a plurality of first via holes arranged at intervals in the first direction, and at least one of the first touch wirings is electrically connected to the at least part of the touch electrodes through the first via holes; and
   the first touch wirings respectively comprise a plurality of first touch sub-wirings extending in the first direction, the second touch wirings respectively comprise a plurality of second touch sub-wirings extending in the first direction, and each of the first touch sub-wirings overlaps with one of the second touch sub-wirings.

2. The display panel according to claim 1, wherein the touch metal bar comprises a plurality of first metal contact parts respectively provided with the first via holes, and a plurality of metal connection parts, wherein each of the metal connection parts is disposed between two adjacent ones of the first metal contact parts and a width of each of the first metal contact parts is greater than a width of each of the metal connection parts.

3. The display panel according to claim 2, wherein the at least one of the first touch wirings further comprises a second metal contact part disposed opposite to one of the first via holes, wherein a width of the second metal contact part is greater than a width of the metal connection part.

4. The display panel according to claim 3, wherein a minimum distance between each of the first metal contact parts and one of the second touch sub-wirings adjacent to the each of the first metal contact parts is greater than or equal to 10 μm.

5. The display panel according to claim 3, further comprising:
   a light-emitting layer disposed between the substrate and the first metal layer, wherein the light-emitting layer comprises a plurality of light-emitting pixels,
   wherein the touch electrodes respectively comprise a plurality of pixel openings each corresponding to one of the light-emitting pixels and a plurality of touch sensing parts each disposed between two adjacent ones of the pixel openings, and each of the touch sensing parts of the at least part of the touch electrodes is electrically connected to the touch metal bar; and
   each of the first via holes is spaced apart from any electric connection between one of the touch sensing parts and the touch metal bar.

6. The display panel according to claim 5, wherein a minimum distance between each of the first metal contact parts and one of the light-emitting pixels adjacent to the each of the first metal contact parts is greater than or equal to 15 μm.

7. The display panel according to claim 3, further comprising:
   a light-emitting layer disposed between the substrate and the first metal layer, wherein the light-emitting layer comprises a plurality of light-emitting pixels,
   wherein the touch electrodes respectively comprise a plurality of pixel openings each corresponding to one of the light-emitting pixels and a plurality of touch sensing parts each disposed between two adjacent ones of the pixel openings, and each of the touch sensing parts of the at least part of the touch electrodes is electrically connected to the touch metal bar; and
   each of the first via holes is disposed at an electric connection between one of the touch sensing parts and the touch metal bar.

8. The display panel according to claim 7, wherein a minimum distance between each of the first metal contact parts and one of the light-emitting pixels adjacent to the each of the first metal contact parts is greater than or equal to 9.8 μm.

9. The display panel according to claim 2, wherein a minimum distance between each of the first metal contact parts and one of the second touch sub-wirings adjacent to the each of the first metal contact parts is greater than or equal to 10 μm.

10. The display panel according to claim 9, wherein a ratio between the width of each of the first metal contact parts and the width of each of the metal connection parts is in a range of 1.5-2; and
    a ratio between the width of each of the first metal contact parts and a width of each of the first via holes is in a range of 3-4.

11. The display panel according to claim 2, further comprising:
    a light-emitting layer disposed between the substrate and the first metal layer, wherein the light-emitting layer comprises a plurality of light-emitting pixels,
    wherein the touch electrodes respectively comprise a plurality of pixel openings each corresponding to one of the light-emitting pixels and a plurality of touch sensing parts each disposed between two adjacent ones of the pixel openings, and each of the touch sensing parts of the at least part of the touch electrodes is electrically connected to the touch metal bar; and
    each of the first via holes is spaced apart from any electric connection between one of the touch sensing parts and the touch metal bar.

12. The display panel according to claim 11, wherein a minimum distance between each of the first metal contact parts and one of the light-emitting pixels adjacent to the each of the first metal contact parts is greater than or equal to 15 μm.

13. The display panel according to claim 2, further comprising:
    a light-emitting layer disposed between the substrate and the first metal layer, wherein the light-emitting layer comprises a plurality of light-emitting pixels,
    wherein the touch electrodes respectively comprise a plurality of pixel openings each corresponding to one of the light-emitting pixels and a plurality of touch sensing parts each disposed between two adjacent ones of the pixel openings, and each of the touch sensing parts of the at least part of the touch electrodes is electrically connected to the touch metal bar; and each of the first via holes is disposed at an electric connection between one of the touch sensing parts and the touch metal bar.

14. The display panel according to claim 13, wherein a minimum distance between each of the first metal contact parts and one of the light-emitting pixels adjacent to the each of the first metal contact parts is greater than or equal to 9.8 μm.

15. A display device, comprising a display panel, wherein the display panel has a display region and a wiring region on a side of the display region, the display panel comprises:

a substrate;

a first metal layer disposed on the substrate, wherein the first metal layer comprises a plurality of first touch wirings disposed in the wiring region;

a second metal layer disposed on a side of the first metal layer away from the substrate, wherein the second metal layer comprises a plurality of touch electrodes disposed at least in the display region, a touch metal bar extending in a first direction in the wiring region and disposed near the display region, and a plurality of second touch wirings disposed in the wiring region, wherein each of the second touch wirings is electrically connected to one of the touch electrodes, and at least part of the touch electrodes are electrically connected to the touch metal bar;

the touch metal bar is provided with a plurality of first via holes arranged at intervals in the first direction, and at least one of the first touch wirings is electrically connected to the at least part of the touch electrodes through the first via holes; and the first touch wirings respectively comprise a plurality of first touch sub-wirings extending in the first direction, the second touch wirings respectively comprise a plurality of second touch sub-wirings extending in the first direction, and each of the first touch sub-wirings overlaps with one of the second touch sub-wirings.

16. The display device according to claim 15, wherein the touch metal bar comprises a plurality of first metal contact parts respectively provided with the first via holes, and a plurality of metal connection parts, wherein each of the metal connection parts is disposed between two adjacent ones of the first metal contact parts and a width of each of the first metal contact parts is greater than a width of each of the metal connection parts.

17. The display device according to claim 16, wherein the at least one of the first touch wirings further comprises a second metal contact part disposed opposite to one of the first via holes, wherein a width of the second metal contact part is greater than a width of the metal connection part.

18. The display device according to claim 17, wherein a minimum distance between each of the first metal contact parts and one of the second touch sub-wirings adjacent to the each of the first metal contact parts is greater than or equal to 10 μm.

19. The display device according to claim 16, wherein a minimum distance between each of the first metal contact parts and one of the second touch sub-wirings adjacent to the each of the first metal contact parts is greater than or equal to 10 μm.

20. The display device according to claim 19, wherein a ratio between the width of each of the first metal contact parts and the width of each of the metal connection parts is in a range of 1.5-2; and a ratio between the width of each of the first metal contact parts and a width of each of the first via holes is in a range of 3-4.

* * * * *